May 26, 1925.

A. C. HERMANN

ENGRAVING MACHINE

Filed Dec. 10, 1921     5 Sheets-Sheet 1

Inventor
Albert C. Hermann
By His Attorneys

May 26, 1925.

A. C. HERMANN

ENGRAVING MACHINE

Filed Dec. 10, 1921

Patented May 26, 1925.

1,539,483

UNITED STATES PATENT OFFICE.

ALBERT C. HERMANN, OF DAYTON, OHIO, ASSIGNOR TO THE NATIONAL CASH REGISTER COMPANY, OF DAYTON, OHIO.

ENGRAVING MACHINE.

Application filed December 10, 1921. Serial No. 521,443.

*To all whom it may concern:*

Be it known that I, ALBERT C. HERMANN, a citizen of the United States, residing at Dayton, in the county of Montgomery and State of Ohio, have invented certain new and useful Improvements in Engraving Machines, of which I declare the following to be a full, clear, and exact description.

This invention relates to a machine for engraving, and in particular for engraving master dies used in forming a number of duplicates.

One of the objects of this invention is to provide a machine to take the place of hand work formerly employed in the cutting of master dies from which impressions are made on duplicates.

Another object of this invention is the provision of mechanism whereby dies can be produced rapidly and economically with relatively unskilled labor in place of highly skilled labor now required in cutting dies for forming numbering wheels and like objects.

Still another object of the invention is to provide a master pattern which may be carefully designed by hand and executed by hand and which can be used as the guide from which the duplicate dies can be made, thus having all of the benefits of careful hand work for the design and all of the benefits of machine work for turning out the duplicate dies themselves.

Another object of the invention is to provide adjustable connections between the master pattern supporting member and the work supporting member for permitting adjustment of the work supporting member independent of the master pattern supporting member.

With these and incidental objects in view, the invention consists in certain novel features of construction and combination of parts, the essential elements of which are set forth in appended claims and a preferred form of embodiment of which is hereinafter described with reference to the drawings which accompany and form part of this specification.

Described in general terms, the embodiment of the invention disclosed in Figs. 1 to 16 comprises a laterally slidable pattern supporting table operatively connected with a rotatable work support, and a tracing pin supporting member movable vertically and laterally, and operatively connected with a cutter supporting member to move the same in unison therewith.

Having reference to Figs. 1 to 16, the machine disclosed therein comprises a base 30 upon which is mounted an upstanding bracket 31 constituting a support for a pattern supporting table 32. The bracket is provided with a dovetailed groove slidably receiving a correspondingly shaped rib projecting from the lower side of the supporting table. A manually operated lever 33 pivoted on a stud 34 on the table and bifurcated to receive a stud 35 carried by the bracket is provided for sliding the table upon its supporting bracket.

The supporting table 32 is controlled in its forward and backward movements by an adjustable device consisting of a threaded rod 36 projecting from the rear of the table and carrying adjustable nuts 37 cooperating with a lug 38 to control its backward movement and adjustable nuts 39 to control its forward movement. The lug 38 is secured to the bracket 31. The rod 36 may be threaded throughout its length, if found desirable.

Secured to the right hand side of the table 32 and extending downward is a plate 45 carrying a roller 46 cooperating with a slot 47 formed in an arm 48. This arm is pinned to a lug 49 projecting from the side of a disk 50 (Figs. 1, 2, 5, 6 and 16) freely mounted upon a shaft 51, and takes an oscillating motion from the sliding table 32.

The slot 47 in the arm 48 is formed to give an oscillating movement to the shaft 51 proportionately less than the movement of the table 32. This arm is detachable so that other arms with slots of various formation may be used to give different oscillating movements to the shaft for purposes hereinafter set forth.

A spring 52 attached to the base 30 and to a pin 53 fast in the disk 50 always tends to move the disk in a clockwise direction.

While the disk 50 is freely mounted upon the shaft 51 its oscillating motion is conveyed to the shaft by a plunger 54 (Figs. 5, 6 and 16) freely fitted in a hole in the disk. Pinned to the plunger is a collar 55 which controls the inward or normal position of the plunger, the plunger being held in its normal position by a spring 56 which is entwined about the plunger between a flange 57 and the side of the disk 50. The plunger is tapered at one end so as to facilitate its entering any one of the holes 58 in an index disk 59 fastened to the shaft 51 by means of a key 60. The various holes in the index disk are for the purpose of changing the position of the first disk 50 with respect to the shaft 51 to place in engraving position different portions of the work which will hereinafter be described. The disk 50 is retained in its lateral position on the shaft 51 by a collar 61.

The shaft 51 is journaled in brackets 62 and 63 fastened to the base 30. A collar 64 fastened to the shaft prevents lateral movement of the shaft to the left. A knurled sleeve 65 fast on the shaft 51 constitutes a means for manually rotating the shaft in indexing the work by placing the different holes 58 in the disk 59 in line with the plunger 54. The left hand end 70 of the shaft 51 (Figs. 1, 5 and 12) is formed to receive a work piece 71 which is held fast on the shaft by a nut 72.

The sliding table 32 supports a master plate 73 (Figs. 1, 10, 11 and 16) which carries the numeral, character or design to be engraved upon the work piece 71. The master plate is not limited to one character but may bear two or more, made up of any combination of numbers or characters, and the plate may be in one piece or sectional.

Cooperating with the master plate is a tracing pin 76 (Figs. 1, 5, 14, 15 and 16) which is caused to follow the outline of the numeral or character on the master plate and convey the same outline or design to the work piece. The pin is supported in a lug projecting forwardly from a carrying member 77. The upper end of the pin is threaded to cooperate with a nut 78 to provide for vertical adjustment. A cap screw 79 threaded in another lug carried by said member serves as a locking means for the tracing pin and adjustable nut. The lower end of the pin 76 is tapered to correspond to the angle edge of the master pattern. In this process of engraving it is more satisfactory to take what is known as a roughing cut, following by the finishing cut. The roughing cut removes the greater part of the surplus metal. In the roughing cut operation a cap 80 (Fig. 15) is applied to the lower end of the pin 76, which causes the cutting tool to roughly outline the design of the master pattern on the work piece 71, after which the cap is removed and the pin 76 following the outline of the master plate will cause the cutting tool to give an exact reproduction of the design to the work piece.

The tracing pin carrying member 77 has a slidable dovetailed connection with a horizontally sliding back plate 81. By this dovetail connection between these two members the tracing tool can be raised and lowered in following the outline of the pattern to reproduce on the work the sharp corners shown on the master pattern.

Fast to the tracing pin carrying member is a yoke 82 (Figs. 3 and 14) which cooperates with an oscillating cam 83 to raise and lower the tracing pin. This cam is fast to a horizontal shaft 84 which is mounted for rocking and sliding movements.

The back plate 81 has a dovetail connection with a plate 88 which permits the plate to move horizontally upon lateral movement of the shaft 84. The plate has two bushings 90 and 91 which constitute bearings for the shaft 84. Pinned to the shaft at the right of the bushing 90 is a collar 92, and at the left of the bushing 91 is a collar 93. The bushings being between the collars will cause the back plate 81 to move laterally with the shaft. The plate 88 is fast to an upright bracket 89 fast to the base 30, The shaft 84 is oscillated and moved laterally by a lever 94 which is fulcrumed on a pin 95 mounted in two plates 96 and 97 which are held in spaced relation at their upper ends by a member 98 riveted or otherwise secured thereto. The lever 94 has teeth 99 formed on its upper edge which mesh with a pinion 100 mounted on a pin 101. This pinion engages with rack teeth 102 formed in the side of the shaft 84. The shaft has a flat surface 103 which cooperates with the member 98 to oscillate the shaft as the lever 94 is raised and lowered. As the lever is moved to the right or left it will cause the shaft to slide laterally in its supports.

A bracket 106 projecting to the right from the plate 88 supports the right hand end of the shaft 84 together with the lever 94 and its cooperating mechanism. The plates 96 and 97 are freely mounted between the lugs 107 and 108 to swing with the shaft 84 as a pivot and are retained in position laterally by these lugs.

The shaft 84 extends to the left and has a bearing in the cutting tool back plate 109 which has a loose dovetailed connection with a plate 110 fast on the upright bracket 89. This dovetail connection between these two members permits the plate 109 to slide horizontally. The horizontal motion of the shaft 84 is conveyed to the cutting tool back plate 109 by mechanism which reduces the movement to any proportion desired. A link 111 is pivoted at the right hand end on a stud fast in the plate 81, the left hand end of the link having a pivotal connection with an arm 112 freely mounted upon a stud 113 fast in the plate 110. Fast to the arm 112 is a cam 114 which, as it moves in a counter-clockwise direction around the pivotal point 113, will cause the plate 109 to slide toward the left, and as the cam 114 moves in a clockwise direction the plate 109 will be moved toward the right by a spring 115 tensioned to keep the plate 109 at all times in contact with the cam 114. The form of the cam is such as to give a reciprocating motion to the plate 109 in any desired proportion to the movement of the tracing tool. A hardened piece 119 is inserted in the plate 109 to form a working surface for the cam.

The spring 115 (Fig. 2) has one end attached to the plate 110 and the other end to a rod 116 supported in a bracket 117 fast on the plate 109. The left hand end of the rod 116 is threaded to cooperate with a spring tension adjusting nut 118.

Slidably mounted on the plate 109 by a vertically extending dovetail connection is a cutting tool supporting member 122. Fastened to this member is a yoke 123 (Fig. 13) which cooperates with a cam 124 slidably mounted upon the shaft but caused to rotate with the shaft by a key 125. This cam is proportionately smaller in size than its companion cam 83 for the reason that the work 71 is proportionately smaller than the master plate. As the tracing pin is raised and lowered by the shaft 84 the cutting tool supporting member will be moved lesser extents in the same directions.

Supported by suitable lugs carried by the member 122 (Fig. 13) is a vertical spindle 126 having a collet 127 holding a cutting tool 128. The head of the collet is tapered to cooperate with the walls of a correspondingly shaped opening in the spindle to grip the cutting tool firmly as it is drawn upward by a bolt 129 which is threaded at its lower end 130 to engage a threaded hole in the collet. The bolt 129 has a flange 131 formed near the top which bears against the top of the spindle to support the bolt as the collet is drawn into the tapered opening at the bottom of the spindle. The spindle is journaled in two bearings 132 and 133 secured in the lugs on the supporting member 122.

Figures 13, 14, 15:
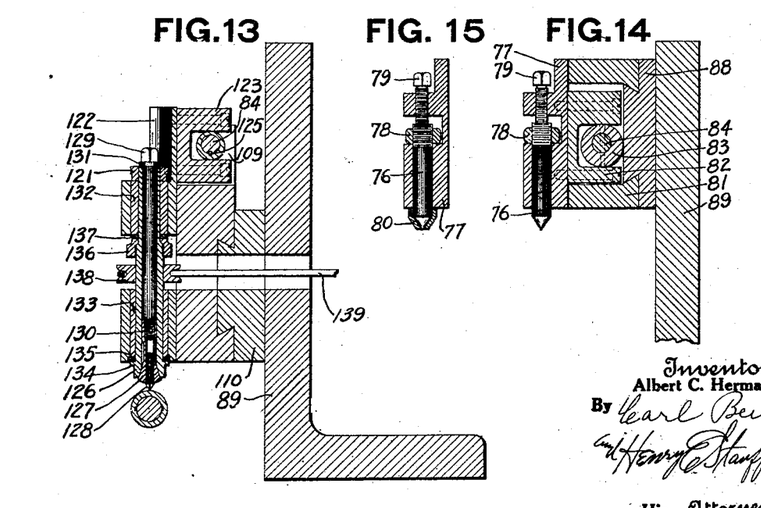
Fig. 13 is a sectional view taken on the line 13—13 of Fig. 5.
Fig. 14 is a sectional view taken on the line 14—14 of Fig. 5.
Fig. 15 is a detail view of the tracing pin with the cap attached for the first operation on work.
Figure 16:
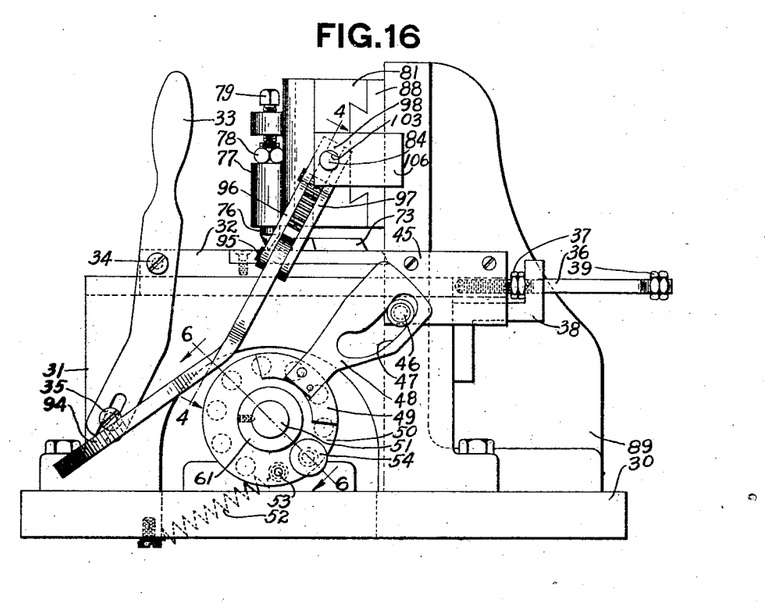
Fig. 16 is a right hand elevation of the machine.

A flange 134 formed near the lower end of the spindle bears against an anti-friction collar 135 fast in the member 122, to take the upward thrust of the spindle.

A collar 121 fast near the top of the spindle and resting upon the bearing 132 takes the downward thrust of the spindle 126. The spindle also has an adjustable nut 136 with an antifriction washer 137 to take up the wear caused by the upward thrust of the spindle. The spindle is rotated at the proper speed by a pulley 138 fast thereto driven by a belt 139 connected to any power driving means.

In order that the machine may not be limited to operate upon work pieces provided with holes fitting the shaft 70 an auxiliary work arbor 145 (Fig. 12) is provided to screw on the end of the shaft 70. The small ends 146 of these arbors upon which the work is fastened may also be made of various lengths to accommodate work of different widths.

Figure 1:
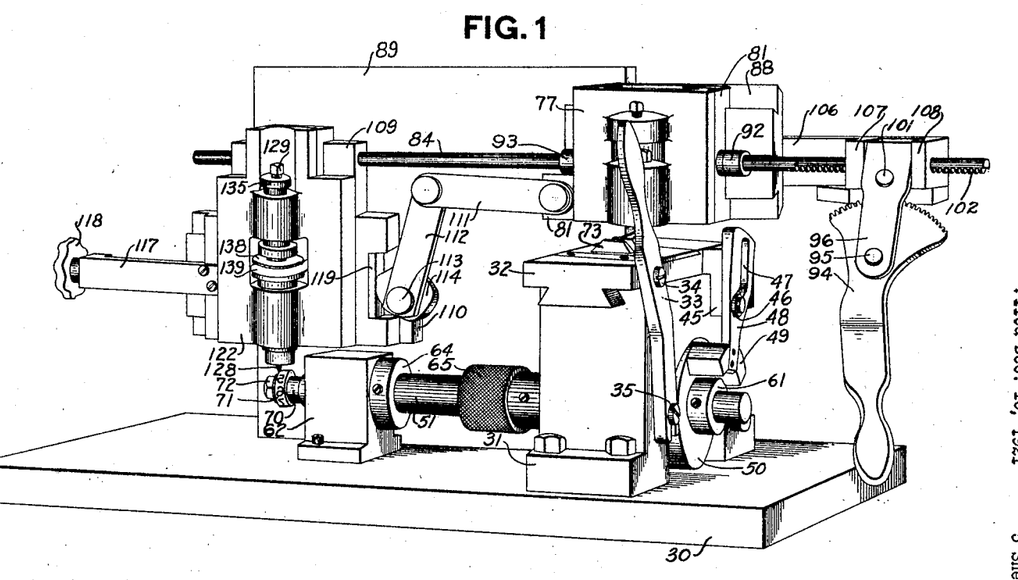
Fig. 1 is a perspective view of the machine with a knurling die in the process of being engraved.
Figures 2, 3, 4:
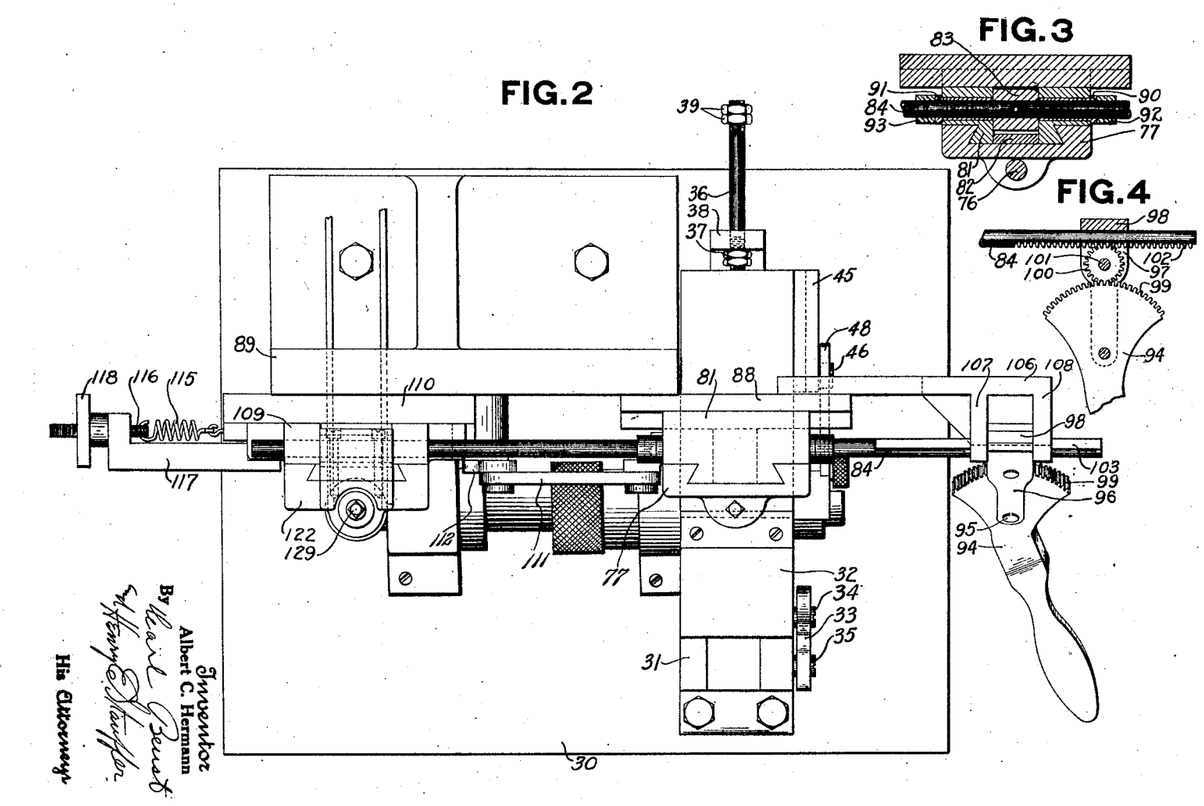
Fig. 2 is a plan view of the machine.
Fig. 3 is a detail sectional view of the follower head taken on the line 3—3 of Fig. 5.
Fig. 4 is a detail sectional view of the operating lever showing the connecting pinion between the lever and shaft, taken on line 4—4 of Fig. 16.
Figures 5, 6, 7, 8, 9, 10, 11, 12:
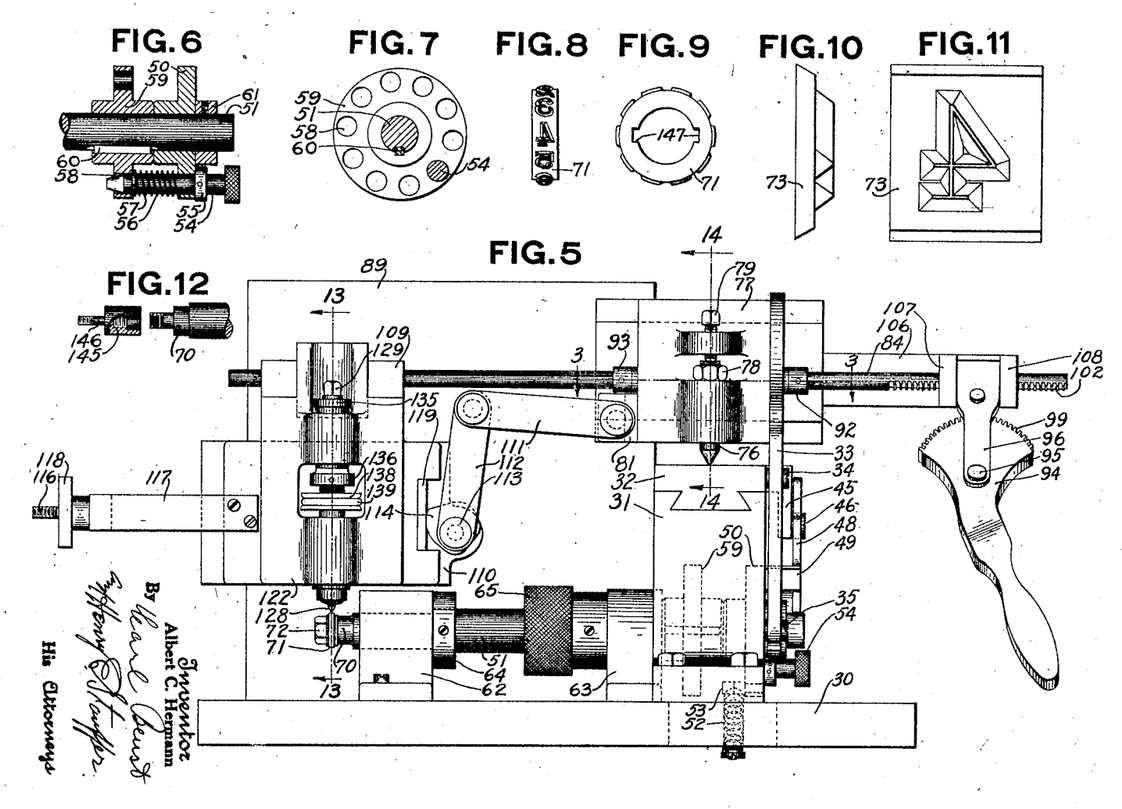
Fig. 5 is a front elevation of the machine.
Fig. 6 is a detail sectional view of the index mechanism taken on line 6—6 of Fig. 16.
Fig. 7 is a detail view shown in elevation of the index plate.
Fig. 8 is an enlarged view of a knurl shown as engraved by the machine.
Fig. 9 is a side elevation of the knurl shown in Fig. 8.
Fig. 10 is an enlarged end view of a master plate.
Fig. 11 is an enlarged front view of the master plate.
Fig. 12 is a detail view of a portion of the work shaft and a detachable mandrel for work with various sizes of holes.

When an auxiliary work arbor is attached to the shaft 70 the work piece 71 is located a greater distance to the left of the bracket 62. This necessitates moving the cutting tool a corresponding distance, and in so doing it is necessary to replace the piece 119 with a correspondingly thicker piece.

Referring to Figs. 8 and 9, the work piece or knurl may contain one or more numerals or characters engraved upon the periphery of the knurl and there may be two or more characters placed side by side. The two slots 147 are for the purpose of locking the knurl to the production machine arbor when using the knurl in reproducing the characters upon stock pieces.

In producing knurls of different diameters, and also figures and characters of various heights and widths, it is necessary to use a master plate 73 and arm 48 corresponding to the proportion of size between the master and the engraved character. The proportion shown in the drawings is ten to one.

While the parts have been shown as proportioned to produce a character on the work of one-tenth of the size of the character on the master plate, it is to be understood that other proportions may be employed so that the character produced may be smaller than, equal to or larger than the character on the master plate and that therefore the same master plate may be employed to engrave characters of different sizes.

When a large work piece is employed it is necessary to use an arm 48 with a slot 47 shaped to effect a smaller angular rotation of the work piece, if engraved characters of the same height are to be produced.

In the production of engraving knurls by hand it is necessary to lay off as many spaces on the surface of the work blank as the number of characters to be engraved. These spaces are usually laid off by dividing the surface in sections by crosscuts.

In the use of the machine herein described, the preliminary work involved in laying off spaces on the work piece is dispensed with, as the holes in the index disk 59 control the proper spacing of the characters produced. When it is desired to engrave a larger or smaller number of characters in a single row on the work piece, it is only necessary to substitute an index disk provided with as many holes as the number of characters to be produced.

Figures 17, 18:
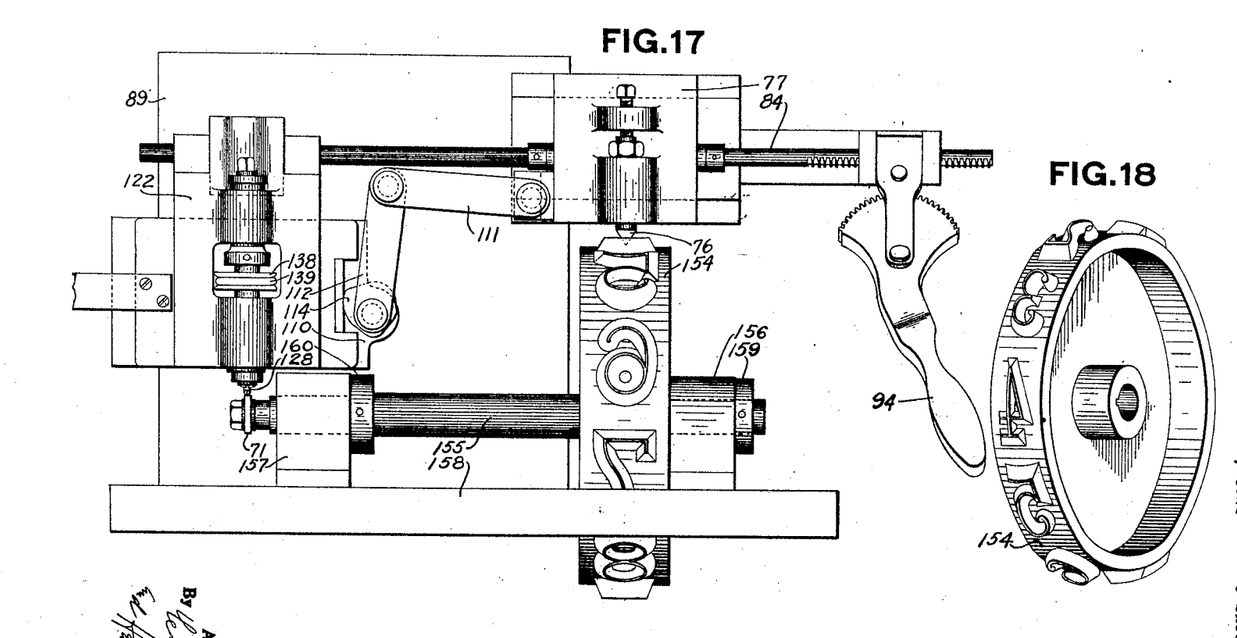
Fig. 17 is a front elevation showing a modified form of the machine in which a master wheel is used instead of a master plate on a sliding table.
Fig. 18 is a perspective view of the master wheel used in the modified form.

In a modified form of the invention shown in Figs. 17 and 18, a master wheel 154, provided upon its periphery with the numerals or characters to be reproduced upon the work piece or knurl 71, is employed instead of the sliding table and master pattern employed in the first embodiment. This master wheel is fast on a shaft 155 which is journaled in bearings 156 and 157 mounted upon the base 158.

The shaft 155 is prevented from moving laterally in its bearings by a collar 159 on its right hand end and the master wheel and a collar 160 near its left hand end.

The tracing pin 76 is caused to follow the outline of the figures or characters by operating the lever 94, as previously described, and manually rotating the master wheel. The tracing pin is mounted in a supporting member 77 and its vertical motion is conveyed to the cutting tool by the shaft 84 and its horizontal motion by the link 111, arm 112 and cam 114, all as in the first embodiment of the invention described.

With the exception of a master wheel in place of a sliding master plate, the mechanism employed is identical with that of the embodiment shown in Figs. 1 to 16.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination of a tracing pin carrying member adapted to slide both horizontally and vertically, a member having a rocking and laterally sliding motion to operate said tracing pin carrying member, and manipulative means for operating said rocking and sliding member.

2. In a machine of the class described, the combination of a slidable master pattern supporting member, a manipulative means for operating said supporting member, a work supporting member, and means for oscillating said work supporting member by a movement of said slidable master pattern supporting member.

3. In a machine of the class described, the combination of a slidable master pattern supporting member, a manipulative means for operating said supporting member, a rotatable work supporting member, means for conveying motion from said slidable member to said rotatable member, and manipulative means for permitting rotation of said rotatable member independent of said slidable member.

4. In a machine of the class described, the combination of a slidable master pattern supporting member, a manipulative means for operating said supporting member, a rotatable disk, means for conveying motion from said slidable member to said rotatable disk, a rotatable work supporting member, and manipulative means for relatively connecting said rotatable disk with said rotatable work supporting member.

5. In a machine of the class described, the combination of a slidable master pattern supporting member, a manipulative means for operating said supporting member, a movable work supporting member, means for conveying motion from said slidable member to said movable member, and manipulative means for permitting movement of said movable member independent of said slidable member.

6. In a machine of the class described, the combination of a movable pattern supporting member, a movable work supporting member, and an operative connection between said members involving relatively adjustable rotatable elements, 7. In a machine of the class described, the combination of a movable pattern supporting member, a movable work supporting member, an operative connection between said members involving relatively adjustable elements one of which is provided with a plurality of holes, and a latch member carried by the other of said elements and adapted to be positioned in any one of said holes.

8. In a machine of the class described, the combination of a movable pattern supporting member, a movable work supporting member, an operative connection between said members involving relatively adjustable rotatable elements one of which is provided with a plurality of holes, and a latch member carried by the other of said elements and adapted to be positioned in any one of said holes.

9. In a machine of the class described, the combination of a movable pattern supporting member, a movable work supporting member, an operative connection between said members involving relatively adjustable elements one of which is provided with a plurality of holes, and a spring pressed plunger carried by the other of said elements and adapted to be projected into any one of said holes.

10. In a machine of the class described, the combination of a movable pattern supporting member, a movable work supporting member, an operative connection between said members involving relatively adjustable elements, one of which is provided with a plurality of connecting means, and a cooperating connecting means carried by the other of said elements and adapted to cooperate with any one of said connecting means.

11. In a machine of the class described, the combination of a tracing pin carrying member adapted to slide laterally, a cutting tool supporting member adapted to slide laterally, and a cam operated by the movement of said tracing pin carrying member for moving said cutting tool supporting member proportionately to the movement of the tracing pin carrying member.

12. In a machine of the class described, the combination of a tracing pin carrying member adapted to slide laterally, a cutting tool supporting member adapted to slide laterally, a shaft moving laterally to operate said tracing pin carrying member, an oscillating handle for sliding said shaft, and means intermediate said tracing pin carrying member and said cutting tool supporting member for moving laterally the cutting tool supporting member proportionately to the movement of the tracing pin carrying member.

13. In a machine of the class described, the combination of a tracing pin carrying member adapted to slide laterally, a cutting tool supporting member, a cam operated by the movement of said tracing pin carrying member for moving said cutting tool supporting member in one direction proportionately to the movement of the tracing pin carrying member, and a spring for moving said cutting tool supporting member in the opposite direction.

14. In a machine of the class described, the combination of a tracing pin carrying member adapted to slide vertically, a cutting tool supporting member adapted to slide vertically, and two cams for moving said cutting tool supporting member vertically proportionately to the movement of the tracing pin carrying member.

15. In a machine of the class described, the combination of a tracing pin carrying member adapted to slide vertically, a cutting tool supporting member adapted to slide vertically, an oscillating shaft provided with means for moving said tracing pin carrying member, a handle for oscillating said shaft, and means provided on said shaft for vertically moving said cutting tool supporting member proportionately to the movement of said tracing pin carrying member.

16. In a machine of the class described, the combination of a slidable master pattern supporting member, an oscillating member operated by said slidable member, a rotatable work supporting member, and manipulative means for connecting said oscillating member with said rotatable member in various relative positions.

17. In a machine of the class described, the combination of a slidable master pattern supporting member, an oscillating member operated by said slidable member, a work supporting member actuated by said oscillating member, and a manipulative means for permitting said work supporting member to be moved relatively to said oscillating member.

18. In a machine of the class described, the combination of a tracing pin supporting member mounted for universal movement in a single plane, a cutting tool supporting member mounted for universal movement in a single plane, a shaft and a plurality of cams for moving the second supporting member upon movement of the first supporting member.

19. In a machine of the class described, a frame member, a pair of spaced plates slidably mounted thereon, a rod journaled in said plates and laterally immovable with respect to one of said plates, an operative connection between said plates to transmit movement from said one plate to the other of said plates, a tracing pin supporting member slidably mounted on one of said plates, a cutting tool supporting member slidably mounted in the other of said plates, and cams on said rod for controlling the movements of said supporting members.

20. In a machine of the class described, a frame member, a pair of spaced plates slidably mounted thereon by tongue and groove connections, a rod journaled in said plates and laterally immovable with respect to one of said plates, an operative connection between said plates to transmit movement from said one plate to the other of said plates, a tracing pin supporting member slidably mounted on one of said plates, a cutting tool supporting member slidably mounted in the other of said plates, and cams on said rod for controlling the movements of said supporting members.

21. In a machine of the class described, a frame member, a pair of spaced plates slidably mounted thereon, a rod journaled in said plates and laterally immovable with respect to one of said plates, an operative connection between said plates to transmit movement from said one plate to the other of said plates, a tracing pin supporting member slidably mounted on one of said plates by tongue and groove connections, a cutting tool supporting member slidably mounted in the other of said plates by tongue and groove connections, and cams on said rod for controlling the movements of said supporting members.

22. In a machine of the class described, a frame member, a pair of spaced plates slidably mounted thereon by tongue and groove connections, a rod journaled in said plates and laterally immovable with respect to one of said plates, an operative connection between said plates to transmit movement from said one plate to the other of said plates, a tracing pin supporting member slidably mounted on one of said plates by tongue and groove connections, a cutting tool supporting member slidably mounted in the other of said plates by tongue and groove connections, and cams on said rod for controlling the movements of said supporting members.

23. In a machine of the class described, a frame member, a rod journaled thereon, a tracing pin supporting member slidably mounted on said frame member, a cutting tool supporting member slidably mounted on said frame member, and cams on said rod for controlling the movements of said supporting members.

24. In a machine of the class described, a frame member, a pair of spaced plates slidably mounted thereon, a rod journaled in said plates and laterally immovable with respect to one of said plates, and operative connection between said plates to transmit movement from said one plate to the other of said plates, a tracing pin slidably mounted on one of said plates, a cutting tool slidably mounted in the other of said plates, and cams on said rod for controlling the movements of said tracing pin and cutting tool.

25. In a machine of the class described, a frame member, a pair of spaced plates slidably mounted thereon, a rod journaled in said plates and laterally immovable with respect to one of said plates, an operative connection between said plates to transmit movement from said one plate to the other of said plates, a tracing pin supporting member slidably mounted on one of said plates, a cutting tool supporting member slidably mounted in the other of said plates, cams on said rod for controlling the movements of said supporting members, a sliding table, a work support, and means for conveying motion from said sliding table to said work support.

In testimony whereof I affix my signature.

ALBERT C. HERMANN.